P. Bottyer,
Harness Trimming.
N° 47,276.  Patented Apr 18, 1865.
Fig. 1.
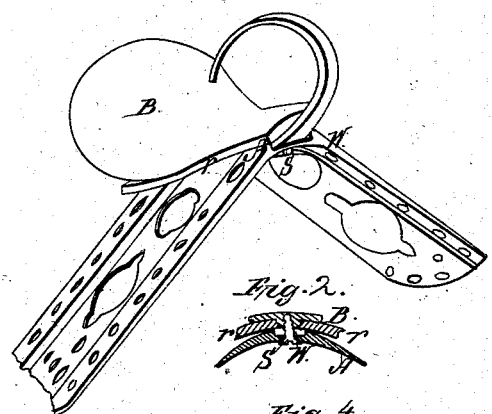
Fig. 2.
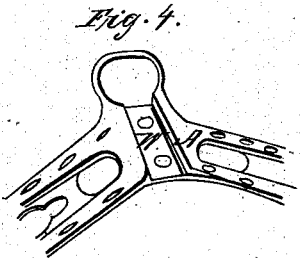
Fig. 3.
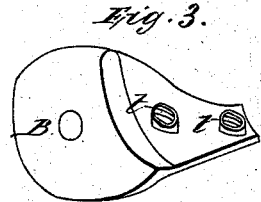
Fig. 4.
Fig. 5.
Fig. 6.
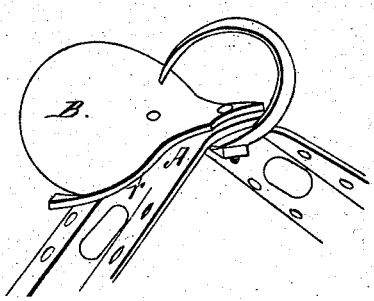
Witnesses:
Inventor:
Potitorus Bottyer

UNITED STATES PATENT OFFICE.

POLITORUS BÖTTYER, OF NEWARK, NEW JERSEY.

IMPROVEMENT IN HARNESS-SADDLES.

Specification forming part of Letters Patent No. 47,276, dated April 18, 1865.

*To all whom it may concern:*

Be it known that I, POLITORUS BÖTTYER, of the city of Newark, in the county of Essex and State of New Jersey, have invented certain Improvements in Harness Saddles; and I do hereby declare the following to be a full and exact description of the same, reference being herein had to the drawings that accompany this specification, and which make part of the same.

The nature of my improvement consists in a peculiar manner of inserting and securing in the saddle-tree the hook for the check-rein and an improved manner of securing the saddle-seat, or what is technically termed the "cantle," to the saddle-tree by the same.

In the drawings, Figure 1 shows the saddle with the improvement; Fig. 2, a section of the same. Fig. 3 shows the seat or cantle turned down side up; Fig. 4, the improved form of the saddle-tree for the holding of the hook. Fig. 5 is a view of the hook. Fig. 6 shows the ordinary manner in which the hook is now fastened to the saddle.

The same letters refer to the same parts in each figure.

In the saddle-tree, Fig. 4, a recess or groove, W, is formed to receive the shank V of the hook, the shank being made to fit tight therein. The two holes through the saddle-tree and the shank correspond to the two projections $t$, on the under side of the cantle or seat, Fig. 3. In these projections is the thread of a screw and flat-headed screws, $s$. The heads countersunk into the under side of the saddle-tree A draw the parts together. Between the seat or cantle B and the saddle-tree A there is inserted a piece of stout leather, $r$. The projections on the cantle or seat $t$ correspond in their length with the thickness of the leather, a due allowance being made for the compression of the leather.

In the ordinary manner, shown in Fig. 6, the hook is placed on the under side of the saddle-tree, and is held by a small bolt and nut, the projecting downward by the nut being an objection thereto, requiring frequently thick padding to keep it from galling the back of the horse.

What I claim, and desire to secure, is—

Inserting the rein-hook in and securing it to the saddle-tree, as hereinabove specified; also, holding the parts of the saddle together in the manner described, when so held in combination with the improved manner of holding the hook.

POLITORUS BÖTTYER.

Witnesses:
   F. J. KRUMEICH,
   CHAS. H. SKINNER.